United States Patent
Schafer et al.

(10) Patent No.: US 9,607,201 B1
(45) Date of Patent: Mar. 28, 2017

(54) SYSTEMS AND METHODS FOR NON-PERMANENT OPERATOR CUSTOMIZATION OF A SCANNING DEVICE

(71) Applicant: DATALOGIC ADC, Inc., Eugene, OR (US)

(72) Inventors: Joseph Schafer, Eugene, OR (US); Scott Horn, Eugene, OR (US)

(73) Assignee: Datalogic ADC, Inc., Eugene, OR (US)

(*) Notice: Subject to any disclaimer, the term of this patent is extended or adjusted under 35 U.S.C. 154(b) by 0 days.

(21) Appl. No.: 15/136,321

(22) Filed: Apr. 22, 2016

(51) Int. Cl.
  *G06F 17/00* (2006.01)
  *G06K 7/14* (2006.01)

(52) U.S. Cl.
  CPC .................. *G06K 7/146* (2013.01)

(58) Field of Classification Search
  USPC .................................. 235/462.15
  See application file for complete search history.

(56) References Cited

U.S. PATENT DOCUMENTS

| | | |
|---|---|---|
| 7,104,456 B2 | 9/2006 | Parker et al. |
| 7,159,783 B2 | 1/2007 | Walczyk et al. |
| 7,594,610 B2 | 9/2009 | Walczyk et al. |
| 8,479,994 B2 * | 7/2013 | Nahill ............... G06K 7/10198 235/462.14 |
| 8,517,269 B2 | 8/2013 | Meier et al. |
| 2008/0148395 A1 | 6/2008 | Brock |

* cited by examiner

*Primary Examiner* — Rafferty Kelly
(74) *Attorney, Agent, or Firm* — Shook, Hardy & Bacon L.L.P

(57) ABSTRACT

Systems and methods for non-permanently customizing scanning device operations for an operator are provided. In embodiments, an operator of a scanning device may scan a data carrier in order to automatically implement one or more customized configuration settings that are preferred by the operator. The scanning device implements the customized configuration settings using instructions and information within the data carrier. The customized configuration settings are held in the volatile memory of the scanning device so that, in response to some operations or indications, the customized configuration settings may be automatically changed back to default configuration settings held in non-volatile memory of the scanning device. Additional embodiments are directed to a distributed environment that uses a centralized server to retrieve and communicate customized configuration settings and the operator's work shift to the scanning device for implementation thereon, for the duration of the work shift.

23 Claims, 5 Drawing Sheets

SYSTEMS AND METHODS FOR NON-PERMANENT OPERATOR CUSTOMIZATION OF A SCANNING DEVICE

CROSS-REFERENCE TO RELATED APPLICATIONS

Not applicable.

TECHNICAL FIELD

The present invention relates to systems and methods of implementing non-permanent operator customization of scanning devices.

BACKGROUND OF THE INVENTION

In a retail setting, a cashier or operator of a scanning device may desire to customize certain settings of a scanning device. For example, a cashier using a hearing aid may not be able to hear an audible indicator issued by the scanning device, and therefore, the cashier may not know whether an item was successfully scanned. The cashier may desire to modify the volume, pitch, or frequency of the audible indicator. However, the retailer desires that any customization of the scanning device by a cashier be temporary, and not interfere with or negatively affect fundamental operations of the scanning device which the retailer wishes to remain unmodified. It has been observed that there is a need for non-permanent customization of scanning devices for individual cashiers.

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention systems and methods for non-permanent operator customization of a scanning device. In one embodiment, a data carrier is scanned by a scanning device in order to automatically implement scanning device configuration settings that are customized and reflect an operator's personal preferences or needs. Instructions for implementing the configuration settings and the configuration settings themselves are provided to the scanning device by way of the data carrier. The configuration settings are implemented by the scanning device using non-persistent memory of the scanning device. The configuration settings may be changed back or may revert to default configuration settings after a period of time, or in response to a triggering operation.

In another embodiment, operator identifying information received using a point-of-sale system is used by a centralized server to retrieve scanning device configuration settings that are specifically customized to the operator identified from the operator identifying information. Instructions are communicated to a scanning device so that the scanning device may implement the configuration settings that are specifically customized to the operator using non-persistent memory. Additionally, the configuration settings may be changed back or may revert to default configuration settings after a period of time corresponding to an operator's work shift.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Figure 1:
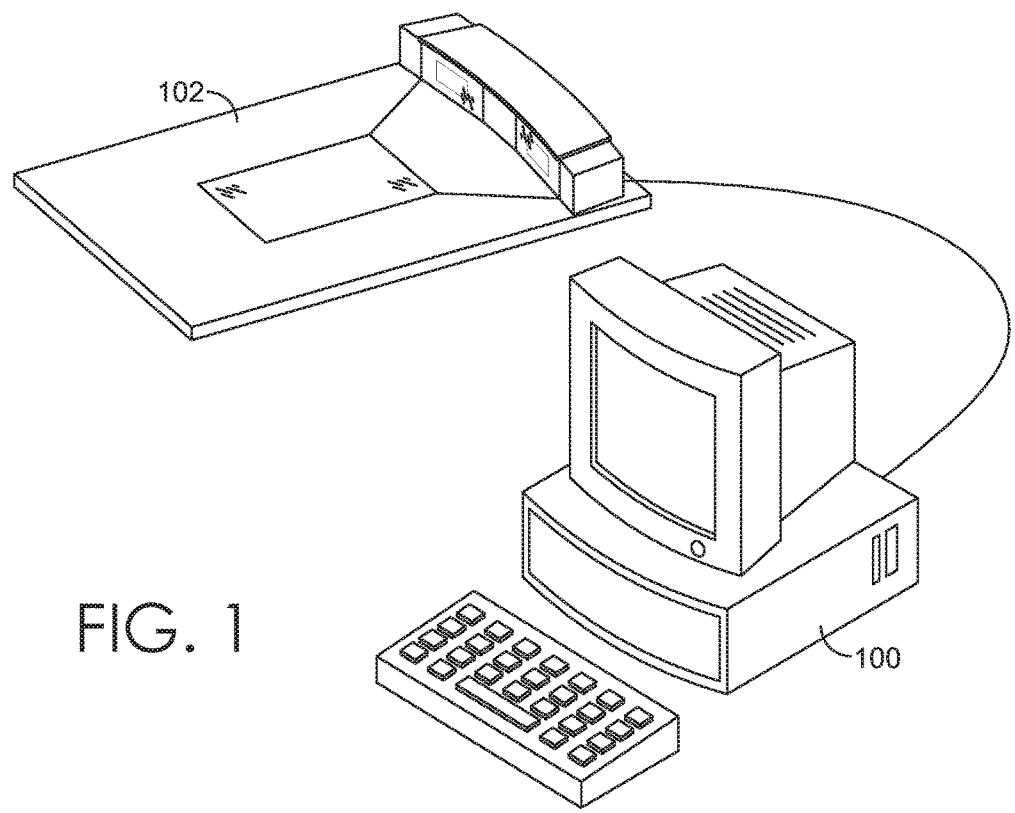
FIG. 1 is an exemplary view of an illustrative point-of-sale system communicatively coupled to a stationary scanning device, implemented in accordance with an embodiment of the present invention.

Embodiments of the present invention relate generally to systems and methods that enable individual operators to non-permanently customize some aspects of a scanning device while keeping fundamental scanning device operations and some retailer preferences intact. In embodiments discussed herein, a scanning device operator may scan or read a data carrier, which includes programming instructions, to automatically implement customizations of the scanning device. When the scanning device executes the data carrier instructions, configuration settings of the scanning device are changed, for example, the scanning device may use an operator-preferred tone as a good read indicator or a different color LED light may be issued for a bad read. The operator's individual preferences may persist indefinitely or may automatically revert back to default configuration settings in response to a power cycle.

In additional embodiments, in response to an operator logging into a point-of-sale system, the operator's individual preferences are automatically retrieved from a server and communicated to a scanning device of the operator. And the operator's individual preferences may persist for the duration of the operator's work shift before automatically reverting the scanning device back to default configuration settings.

In a first aspect, a scanning device is provided. The scanning device comprises a persistent memory configured to store a set of default configuration settings and a non-persistent memory configured to implement a set of current configuration settings. The set of current configuration settings determine one or more operations of the scanning device, in embodiments. The scanning device comprises a scanning component configured to read a data carrier. And the scanning device comprises a processor. In embodiments, the processor is configured to populate the set of current configuration settings with the set of default configuration settings retrieved from the persistent memory. And the processor is further configured to recognize a flag in the data carrier read by the scanning component. In embodiments, the flag indicates that the data carrier includes executable instructions to modify at least one of the set of current configuration settings. The processor is configured to modify the at least one of the set of current configuration settings using one or more tags identified in the executable instructions of the data carrier. And, in some embodiments, upon receiving an indication of an operation triggering reversion, the processor is configured to revert the at least one of the set of current configuration settings that have been modified back to the set of default configuration settings.

In another aspect, a method for providing non-permanent customization of scanning devices is provided. The method comprises implementing a set of current configuration settings using non-persistent memory. In embodiments, the set of current configuration settings determines one or more customizable operations of the scanning device. The method includes reading a data carrier. Then, the method recognizes a flag in the data carrier. In embodiments, the flag indicates that the data carrier includes instructions to modify at least one individual configuration setting of the set of current configuration settings. The method continues by executing, based on the flag, the instructions included in the data carrier to modify the at least one individual configuration setting of the set of current configuration settings. The at least one individual configuration setting is modified, in embodiments, using one or more tags identified in the data carrier. Then, the method comprises reverting the modified at least one of the set of current configuration settings upon receiving an indication of an operation triggering reversion. The reversion purges the at least one of the set of current configuration settings that was modified from the non-persistent memory and populates the at least one of the set of current configuration setting using a set of default configuration settings stored in persistent memory.

In yet another aspect, a system providing non-permanent customization of scanning devices is discussed. The system includes a server and a database. The server comprises a memory and is coupled to one or more processors, in embodiments. Generally, the server is configured to, upon receipt of an indication of an operator identifier from an external point-of-sale system, retrieve an operator-specific preference and a work shift from a database. The server is further configured to generate instructions for implementation of the operator-specific preference at a scanning device for a duration of time corresponding to the work shift. In embodiments, the server communicates the instructions, the operator-specific preference, and the work shift to the external point-of-sale system. The external point-of-sale system is directed to forward the instructions, the operator-specific preference, and the work shift to the scanning device, in some embodiments. In one embodiment, the scanning device is communicatively coupled to the external point-of-sale system. The database comprises a memory and is configured to store a plurality of operator-specific preferences and a plurality of work shifts for a plurality of operators.

And, in another aspect, a method providing non-permanent customization of a scanning device is provided. The method comprises retrieving an operator-specific preference and a work shift from a database using the operator identifier upon receiving an indication of an operator identifier from a point-of-sale system. The method communicates instructions to the point-of-sale system, in embodiments. The point-of-sale system is directed to communicate the instructions, the operator-specific preference, and the work shift to a scanning device communicatively coupled to the point-of-sale system, in some embodiments. As the operator-specific preference is to be implemented at the scanning device using non-persistent memory, the method continues to customize the scanning device for the operator. And, in some embodiments, the operator-specific preference is to be implemented at the scanning device for a duration of time corresponding to the work shift of the operator.

Exemplary Localized Embodiments

Embodiments of the invention, as will be explained in further detail hereinafter, may be implemented for scanning devices, such as those exemplary scanning devices depicted in FIGS. 1 and 2. Beginning with FIG. 1, an exemplary point-of-sale (POS) system 100 and an exemplary stationary scanning device 102 communicatively coupled are provided, in accordance with an embodiment of the present invention. The stationary scanning device 102 of FIG. 1 is fixed or stationary, in that the scanning device may be implemented at a check stand, check-out lane, or customer "self" check-out kiosk, for example, in a retail setting. Generally, an exemplary scanning device is a device configured to scan and/or read a data carrier, such as optically encoded information conventionally known as a barcode, for example. At a high level, a scanning device may use any number of components to scan and/or read a data carrier. In one embodiment, the scanning device includes a scanning component configured to scan and/or read a data carrier. Illustrative scanning devices and/or scanning components may: utilize a light emitting diode (LED) and/or a photo-diode to transmit light and/or capture light reflected off of a physical data carrier; emit one or more laser beams to be used in tandem with one or more mirrors for the recapture of, at a diode, laser light reflected back from a physical data carrier; utilize a charge coupled device (e.g., a plurality of LEDs comprising an LED scanner) paired with one or more sensors for measuring voltage(s) of ambient light that is/are usable to read a physical data carrier; and/or utilize a camera for capturing an image of a physical data carrier. Exemplary scanning devices may be configured to scan, read, recognize, capture an image of, and/or identify two dimensional objects and/or three dimensional (3D) objects. Further illustrative scanning devices include a barcode scanner, an infrared scanner, a radio frequency (RF) scanner, a charge coupled device (CCD) scanner, a holographic scanner, a laser scanner, an optical scanner, an image scanner, a radio frequency identification (RFID) scanner, a color scanner, an omnidirectional scanner, a Bluetooth® scanner, a pen-type reader, and/or a camera. It will be understood that these examples are non-limiting, as scanning devices not listed herein are contemplated to be within the scope of this disclosure.

Exemplary data carriers include one or more symbols, indicia, optically encoded information, and/or other data that may be scanned and/or read by a scanning device. Exemplary data carriers may include linear type barcodes, Code 32, Code 39, 1D linear barcodes, Code 128, Universal Product Codes (UPC), multi-row type barcodes, stacked barcodes, 2D multi-row barcodes, data matrix type codes, 2D barcodes, Quick Response (QR) codes, MaxiCodes, Aztec Codes, RFIDs, images, Global Standards (GS-1)

approved data carriers, European Article Number (EAN) approved data carriers, and/or any other data carriers that are capable of optically encoding information and are at least machine readable. It will be understood that these examples of data carriers are non-limiting, and other types or styles of data carriers not listed herein are considered to be within the scope of this disclosure. Accordingly, it will be understood that data carriers including black and white, one or more color, lines and spaces, dots, shapes, and/or a combination thereof are all considered to be within the scope of this disclosure. And, although several examples provided herein include data carriers visible to the human eye, machine readable data carriers that are invisible to the naked eye are considered to be within the scope of the invention. As such, data carriers may be generated using printing, stamping, embossing, and/or labeling techniques.

The stationary scanning device 102 may be communicatively coupled to a POS system 100. As used herein, a device is communicatively coupled to another device when data and/or information encoded as data may be transmitted, wirelessly or via a hard wired connection and/or interfaces, and exchanged between said devices, in a single direction or bidirectionally, either directly (e.g., hard wired to one another in a port-to-port fashion, a wireless peer-to-peer connection, or via a collaborative session) or indirectly (e.g., via a server, a telecommunications network, or a cloud), for example. The stationary scanning device 102 of FIG. 1 may utilize any kind of interface for output. Non-limiting examples of output interfaces include Recommend Standard number 232 (RS-232) serial, Universal Serial Bus (USB), keyboard wedge (KBW), Personal System 2 (PS/2), and/or any Original Equipment Manufacturer (OEM) interface. Additionally, non-limiting examples of output interfaces may be wireless interfaces that leverage one or more radio frequencies and/or wireless networks (e.g., Institute of Electrical and Electronics Engineers (IEEE) standards in the 802 family such as 802.11g (WLAN), 802.15.1 (Bluetooth®)).

The POS system 100 of FIG. 1 includes a computing device that communicates with a host server (not shown). At a high level, the POS system 100 facilitates completion of retail transactions. The POS system 100 may be a check stand or check-out lane at a grocery store, a department store, and/or other retailer, in some embodiments. For example, an operator uses the stationary scanning device 102 to read a data carrier of products that a customer desires to purchase, and the stationary scanning device 102 identifies the products for purchase and uses an output interface to provide product information as input to the POS system 100 that is communicatively coupled to the stationary scanning device 102. As used herein, "operator" refers to a person (e.g., sales associate or cashier) operating or using a scanning device for facilitating retail transactions at a POS. The POS system 100 may retrieve pricing information, which may be displayed using a GUI to the customer and/or the operator. In embodiments, the POS system 100 generates a GUI which is displayed via one or more display devices (GUI). And the POS system 100 further includes, in embodiments, one or more input and output (I/O) components for receiving and outputting information to an operator of the scanning device. Exemplary I/O components may include a number keypad, a keyboard, a touchscreen, a mouse, a trackpad, a track ball, a motion tracking sensor, a gesture recognition module, and the like.

Figure 2:
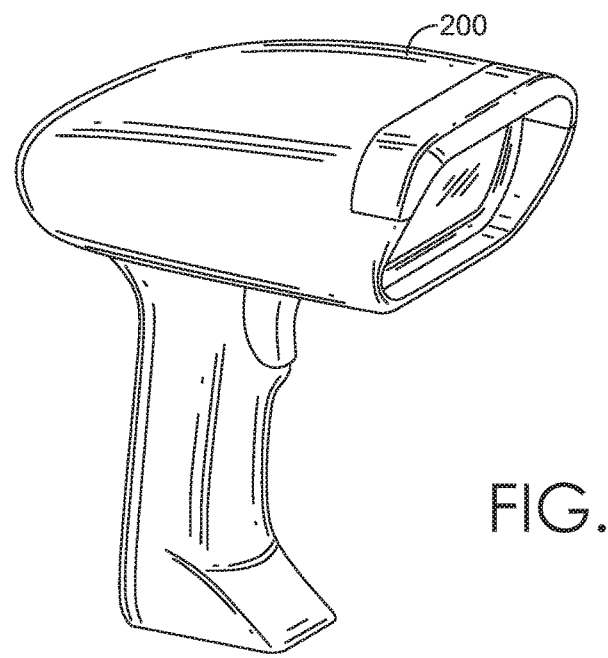
FIG. 2 is an exemplary view of an illustrative portable scanning device, implemented in accordance with an embodiment of the present invention.

Turning to FIG. 2, an exemplary portable scanning device 200 is provided, in accordance with an embodiment of the present invention. A portable scanning device refers to a portable or "handheld" type of scanning device that, generally, may be held in the right and/or left hand of an operator during use, for example. The portable scanning device 200 may include any of the features, techniques, and characteristics discussed previously with regard to the exemplary stationary scanning device 102 of FIG. 1, and thus, the portable scanning device 200 will not be described at length. The portable scanning device 200 may be communicatively coupled to a POS system via any of the interfaces previously described, in embodiments.

At a high level, each of stationary scanning device 102 and portable scanning device 200 include memory for storage of data and executable computer programs or modules. Each of stationary scanning device 102 and portable scanning device 200 further comprise one or more processors for execution of said programs and modules stored within the memory of the scanning devices, retrieval and use of the stored data and/or any received input, and/or formulating output for communicating via the previously described interfaces. Generally, the memory includes persistent memory and non-persistent memory. As used herein, persistent memory refers to memory that is configured to permanently store data, or at least, that is configured to retain data stored thereon in the absence of a power supply. In one embodiment, a persistent memory is configured to store a set of default configuration settings. Examples of persistent memory include nonvolatile memory types such as Read-Only Memory (ROM), Programmable Read-Only Memory, (PROM), Erasable Programmable Read-Only Memory (EPROM), and Electrically Erasable Programmable Read-Only Memory (EEPROM), Flash memory, solid-state storage (SSS), hard disk drives, and/or optical disk drives. As used herein, non-persistent memory refers to memory that is configured to non-permanently store data, or at least, that is not configured to retain data stored thereon in the absence of a power supply. In one embodiment, non-persistent memory is configured to implement a set of current configuration settings, wherein the set of current configuration settings determine one or more operations of the scanning device. Exemplary non-persistent memory includes volatile memory types such as Random Access Memory (RAM), Dynamic Random-Access Memory (DRAM), and Static Random-Access Memory (SRAM). In some embodiments, non-persistent memory is used as a runtime environment for the one or more processors to execute computer programs and modules that support scanning device functions and operations. As will be understood, the exemplary persistent and non-persistent memory examples included and recited herein should not be construed as limiting as other persistent and non-persistent memory are considered to be within the scope of the invention. The persistent and non-persistent memory may be tangible hardware within each of the stationary scanning device 102 and portable scanning device 200, in embodiments. This tangible memory hardware may store executable computer programs or modules as software and/or firmware for implementation by the one or more processors.

Generally, the memory of the scanning device may be described, conceptually, in terms of blocks which are used for implementing operations of the scanning device: a factory block, a user block, and a current block. A block, at a high level, refers to a structuring of data. A block is a data structure comprising a sequence of bytes or bits, and the block has a block size that defines a maximum length of a sequence of bytes or bits, as will generally be understood by those having skill in the relevant art. Block data storage and data structuring will not be explained in depth herein for the purpose of brevity. As used herein, a factory block refers to a portion of persistent memory configured to store data, including fundamental scanning device operations generally loaded by a manufacturer. Fundamental operations may refer to operations crucial to the functioning of the device and which are not desirable to change or reprogram, such as exemplary operations that control: powering up, powering down, light emissions or light sources (e.g., an LED, a laser beam, a camera) for scanning a data carrier, capture of data carrier reflected light (e.g., a diode), and/or interface support for communications with a POS system.

The user block, as described herein, refers to a portion of persistent memory configured to store one or more sets of user-tailored configurations. As used herein, a "user" refers to a retailer or retail store entity, such that a user refers to a retail entity that employs an operator of a scanning device within a retail store. Each of the one or more sets of configuration settings may be specific to different or distinct users and/or may be compatible with different output interfaces. For example, the user block may store a plurality of sets of configuration settings, each set corresponding to the same set of configuration settings; however, each set may include different values for individual configuration settings, providing for tailored scanning device configurations. This enables a user to pick and choose a preferred set of configuration settings to implement in a retail store, for example.

The current block refers to a portion of non-persistent (e.g., volatile) memory configured to store the configuration settings that are to be used by the scanning device and/or which are currently in use by the scanning device. As used herein, the term "current block" may be used interchangeably with the term "current." The factory block and the user block correspond to persistent memory, whereas the current block corresponds to non-persistent memory. Each of the factory block, the user block, and the current block are memory locally stored at the scanning device.

At a high level, the current block holds, in non-persistent memory, the current configuration settings that are in use by the scanning device. The current block may be a runtime environment populated using data stored in one or more of the factory block and the user block, in some embodiments. In this way, data including configuration settings and values defining each setting, as stored in the factory block and/or the user block, may be used to populate the current block, wherein configuration settings are implemented at the scanning device using one or more processors.

In terms of scanning device operations, default configuration settings are settings stored in the factory block and/or in the user block. Default configuration settings are those configuration settings which a user has designated for loading when a scanning device is booted up or powered up, for example. In a retail store, for example, the same default configuration settings will be automatically loaded into each scanning device, producing consistency for the user within a retail store and/or across several locations. In one embodiment, the default configuration settings are populated using factory-standard settings stored in the nonvolatile default block. In another embodiment, the default configuration settings are populated using user-tailored settings stored in the nonvolatile user block. In yet another embodiment, the default configuration settings are populated using a portion of settings stored in the nonvolatile user block and a portion of settings stored in the nonvolatile factory block. And, in another embodiment, the default configuration settings are generally populated using user-tailored settings stored in the nonvolatile user block unless or until a user desires to restore the scanning device back to the factory-standard configuration settings stored in the nonvolatile factory block. In another embodiment, a user may desire to restore the scanning device back to the user-tailored settings stored in the nonvolatile user block, as stored at a previous date and time. These examples of restoring the system of the scanning device may be implemented in scenarios where the user-tailored settings stored in the nonvolatile user block contain "bugs," errors, and/or for another reason. The default configuration settings may include fundamental and non-fundamental configuration settings for scanning devices.

The factory block, the user block, and the current block may each store non-fundamental configuration settings for the scanning device which are desirable to change or reprogram, unlike the fundamental operations that are critical to the proper functioning of the scanning device and which are generally not desirable to change or reprogram. Non-fundamental configuration settings may refer to configuration settings that correspond to or affect operator performance and which are operator feedback mechanisms. Non-fundamental configuration settings may include exemplary operations that control sensory output to an operator of a scanning device or that may be customized to enhance an operator's performance when using the scanning device. Sensory output may be used to indicate whether a scanned data carrier was a "good" read or a "bad" read, as determined via the POS system, in some aspects. Generally, a good read refers to a POS system having successfully retrieved or "located" information corresponding to a scanned data carrier and/or data content of the scanned data carrier (e.g., POS system correctly or successfully identifies a product based on the data carrier information received from the scanning device). A bad read refers to a POS system having unsuccessfully retrieved, or being unable to locate, information corresponding to a scanned data carrier and/or data content of the scanned data carrier. When a bad read occurs, the POS system may instruct the scanning device to issue a bad read indicator, such that the scanning device issues sensory output such as a chirp or a blinking light, in some examples. For example, a POS system may recognize and identify a product based on successfully locating information corresponding to a data carrier scanned by a scanning device, such that the POS system instructs the scanning device to issue a good read indicator. And, in one example, the POS system is unable to recognize a product as no information is found regarding a scanned data carrier, thus resulting in a bad read indicator being issued via the scanning device. Exemplary sensory outputs include a blinking or lit indicator light, a color of a good-read indicator light, a color of a bad-read indicator light, one or more audible tones of a good-read indicator, one or more audible tones of a bad-read indicator, a volume of an indicator sound or tone, a duration of an indicator sound or tone, a duration of an indicator light, and/or any combination or sequence thereof.

However, the user's (e.g., retail entity) preferred non-fundamental configuration settings, including settings for various sensory outputs, may not be suitable for some operators. For example, a red-green color-blind operator may desire to change an indicator light from a green color to a blue color, and to change another indicator light from a red color to a yellow color (e.g., or other spectrum manifesting as yellow), as the operator's ability to visually distinguish between red and green colors is very difficult. The user may desire for the operators to customize the indicator light colors, but may desire that the change be non-permanent so that another operator of the scanning device may use the default configuration settings later.

Additionally, non-fundamental configuration settings may include preferences with regard to the sensory output or the operations that may be customized to enhance an operator's performance when using the scanning device. Exemplary customizable configuration settings that aid operator performance include a double-read timeout. A double-read timeout (i.e., double-read latency) is a time limit that determines an amount of time to allow to lapse before the scanning device and/or the POS system are allowed to subsequently read and/or recognize one or more data carriers comprising the same data content (e.g., a time duration during which a subsequent and successive scan of at least one data carrier is disregarded or ignored because the data carrier(s) being subsequently scanned include(s) or cause(s) the POS system to retrieve the same data content). In various embodiments, the double-read timeout may be selected from a plurality of predetermined time periods and/or may be determined via input by a user. However, the user's (e.g., retail entity) preferred double-read timeout may not be suitable for some individual operators who may scan items faster or slower than other operators. An operator may wish to increase or decrease the double-read timeout depending on the operator's experience and skill. And the user may desire that each operator be able to customize the double-read timeout but only temporarily, so that the next operator of a scanning device may use the default configuration settings.

In yet another example, the user's (e.g., retail entity) preferred non-fundamental configuration settings include issuing an error sound for a bad read; however, the error sound may not be properly detected and amplified by an operator's hearing aid. The operator may desire to change a frequency, tone, pitch, and/or volume of the error sound to an error sound that the operator's hearing aid detects and amplifies properly. While the user may desire for the operator to have the ability to customize the error sound, the user may also desire that the error sound automatically revert back to the default configuration settings, which are the preferred non-fundamental configuration settings, at a later time. Then, the next operator of the scanning device may use the default configuration settings.

Using the one or more processors of the scanning device, such as stationary scanning device 102, for example, an operator may quickly customize one or more sensory outputs and/or performance operations of the scanning device, such as a good-read indicator light, sounds, and the like. First, a processor of the scanning device may be configured to populate the set of current configuration settings with the set of default configuration settings retrieved from the persistent memory. The processor may populate the current configuration settings, as held in the current block (e.g., non-persistent memory), using default configuration settings stored in the factory block and/or the user block (e.g., persistent memory). The current block may be loaded with default configuration settings when a scanning device is turned on, powered up, reset, "woken" from a sleep mode, unlocked, and/or power cycled.

The scanning component of the scanning device may be used by an operator to scan and/or read a data carrier. The processor may recognize a flag in the data carrier read by the scanning component. In embodiments, the flag indicates that the data carrier includes executable instructions to modify at least one of the set of current configuration settings. In one embodiment, the data carrier includes a flag, which designates the data carrier as a programming-type of data carrier. The flag is an indicator or signal that informs the processor of the scanning device that the data carrier is to be processed as a program, and further may include data relevant to the program. Thus, the flag signals that the data carrier should not be conventionally processed (e.g., after identification of a data carrier in a retail environment, information is sent out a host port to a POS system). The flag may be encoded data within the data carrier, in some embodiments, and thus is a digital or electronic flag.

In one embodiment, the flag indicates, specifically, that the programming data carrier instructions are to be implemented via the current block in the non-persistent memory. The flag, for example, signals to the processor that only the current block is to be modified via the programming data carrier instructions, and the factory block and user block are to remain unmodified. In one embodiment, the processor determines that the flag in the data carrier includes executable instructions for non-permanently modifying a portion of the set of current configuration settings. The portion of current configuration settings to be modified may be non-fundamental configuration settings that affect operator performance and which are operator feedback mechanisms, in embodiments.

At a high level, the programming data carrier instructions include customizations of the current configuration settings which are specific to the operator or which are preferred by the particular operator seeking to modify the scanning device. For example, each individual operator may be provided with a data carrier that includes operator-specific instructions for customization of a scanning device.

Based on the flag, the processor processes the programming data carrier by using and executing the executable instructions of the data carrier. The executable instructions, as implemented by the processor, may modify a set of current configuration settings in the current block. During execution of the programming data carrier instructions, the instructions are not stored in the persistent memory of the scanning device. Using the programming data carrier instructions, the processor is configured to modify the at least one of the set of current configuration settings of the scanning device. In further embodiments, the programming data carrier instructions are used to modify current configuration settings that are held in the current block. Additionally or alternatively, execution of the instructions by the processor may be performed to modify one or more values for a portion of the set of current configuration settings implemented in the current block, via the non-persistent memory.

Additionally, the processor modifies current configuration settings using or based on one or more tags identified or recognized in the data carrier and/or the programming data carrier instructions. At a high level, the programming data carrier instructions may include tag value pairs. A tag value pair includes bytes which encode a tag identifier and a tag value. In a single tag value pair, the tag identifier is usable by the processor to identify a corresponding individual configuration setting and the tag value is usable by the processor to modify the individual configuration setting identified by the tag identifier. In some embodiments, the processor uses the tag value pairs to identify specific current configuration settings to be modified via the instructions, and then uses the tag values to replace values in the current configuration settings that were originally populated using the default configuration settings of the factory block and/or user block. In an embodiment, the processor may populate an individual configuration setting of the set of current configuration settings with a new value specified in the one or more tags identified in the data carrier, wherein the new value is not the same as a prior value used to populate the individual configuration setting of the set of current configuration settings from the set of default configuration settings.

Generally, the modification of the current configuration settings is performed automatically. In response to the scanning component reading the data carrier and the processor recognizing the flag, the processor automatically performs the modifications without requiring the operator to provide any additional input, for example. Accordingly, the processor is configured to modify the at least one of the set of current configuration settings using one or more tags identified in the instructions of the data carrier, in embodiments. The processor may modify a plurality of configuration settings in the current block, in one embodiment. The processor may modify only a portion of configuration settings in the current block. The processor may identify one or more individual configuration settings in the set of current configuration settings to be modified based on the one or more tags. And, in one embodiment, the processor may modify only a portion of the set of current configuration settings using the one or more tags identified in the instructions of the data carrier.

Generally, the processor uses the tags and instructions to modify non-fundamental configuration settings that are in use as current configuration settings via the current block. These non-fundamental and current configuration settings are modified so that the scanning device is customized for the operator. However, fundamental configuration settings remain intact and unmodified within the current configuration settings via the current block, in embodiments. Accordingly, only portions of the current block may be modified, such that the entire current block is not replaced via the programming data carrier instructions, in some embodiments. At a high level, the data carrier includes all of the information and instructions needed for the operator to immediately customize the scanning device upon simply scanning the data carrier.

In further embodiments, the programming data carrier instructions specify timing features, which provide for the modifications to lapse after a predetermined period of time. In this way, an operator may scan the programming data carrier instructions in order to customize a scanning device by shortening the double-read timeout in preparation for a retail customer rush or a high volume of scans and transactions; however, the modifications may lapse automatically after a two hour period, when the retail customer rush is expected to end the volume of scans and transactions are expected to return to normal volumes. Using such time-tailored modifications to the double-read timeout, an operator may be able to scan items faster "on the go" or as needed in the ever-changing retail environment, providing better customer service and improving transaction efficiency. And because the modifications to the current configuration settings are performed automatically, the operator experiences negligible downtime and may implement said modification at a moment's notice.

In some embodiments, the scanning device may issue a sensory output to provide a confirmation to an operator that the modifications were successfully implemented into the current configuration settings. For example, the scanning device may use a speaker to issue a tone or sound or speech that provides a confirmation of the modifications' implementation. In another example, an n segment display (e.g., a seven segment display or a six digit display) in a scanning device window may provide a confirmation message or confirmation code that is visible to the operator. Such a segment display may provide a constant display of a confirmation message or a scrolling confirmation message, which may or may not be repeatedly displayed any number of times. The n segment display might further display an identifier that is unique to the operator in order to indicate that the scanning device has implemented modifications of the data carrier, as preferred by the particular operator. As such, an operator is provided a confirmation that their own individual preferences for the scanning device configurations are successfully implemented and ready for use. Although an n segment display is discussed, other types of displays or output components that are capable of visibly presenting information are contemplated to be within the scope of this disclosure and the examples herein should not be construed as limiting. For example, a liquid crystal display (LCD) or an LED display may be used. In some embodiments, such a display is directly coupled to the scanning device and/or is separate from a POS system.

Continuing, the scanning device may receive or experience an indication of an operation triggering reversion. As used herein, to "revert" or a "reversion" refers to reversing, undoing, or purging the modifications to configuration settings of the current block from the scanning device. Further, to revert or a reversion may include changing one or more configuration settings in the current block back to default configuration settings. Based on the indication of the operation triggering reversion, the modified current configuration settings are reverted or modified back to premodification configuration settings. The reversion of the current configuration settings may utilize and/or be repopulated using a set of default configuration settings stored in the factory block and/or user block (e.g., persistent memory). In one embodiment, all configurations in the entire current block are repopulated using default configuration settings. Alternatively, only those configurations in the current block that were modified are repopulated using default configuration settings.

The operation triggering reversion may be any operation involving the following: a power cycle; a hard reset; a soft reset; a warm reset; an operation sufficient to purge the non-persistent memory; an operation including reloading at least a portion of operating instructions of the scanning device; an operation indicating a change in operators of the scanning device; an operation indicating an end of a work shift of an operator; recognition of another data carrier scanned by the scanning component and including a flag indicating a reversion to the default set of configuration settings; and recognition of a subsequent scan of the same or similar programming data carrier including the flag indicating a modification to at least one of the set of current configurations. Additionally or alternatively, exemplary operations triggering reversion may be in response to entry of a user pin number, a password, a combination of concurrent keyboard depressions, and/or another indication that may include the POS system.

In one embodiment, an operator may use the scanning device to re-read the same or similar data carrier and trigger reversion, or may read a new data carrier and trigger reversion. In another embodiment, the scanning device may be powered down and powered up, reset, or placed into a "sleep" or dormant mode. In yet another embodiment, any operation triggers reversion when the operation is sufficient to trigger a purge or a dump of non-persistent memory (e.g., current block, RAM). In a further embodiment, any operation triggers reversion when the operation is sufficient to trigger a purge or a dump of at least a portion of the non-persistent memory including the modified current configuration settings. And any operation may trigger reversion when the operation is sufficient to trigger a purge or a dump of only that portion of the non-persistent memory including the modified current configuration settings, in one embodiment. Generally, the set of default configuration settings are predefined factory settings or predefined user settings permanently stored in the persistent memory, whereas the set of current configuration settings are temporarily held in the non-persistent memory such that the operation triggering reversion results in a loss of the modified at least one of the set of current configuration settings as the non-persistent memory is cleared (as a result of the triggering operation) while the persistent memory remains intact.

In another embodiment, the operation triggering reversion operates to reset at least a portion of components of the scanning device, or only a portion of components of the scanning device, that were affected by the modification of the current configuration settings. In such an embodiment, the scanning device itself need not be completely reset, but rather, only those indicator lights or speakers affected by the modifications are reverted and repopulated using default configuration settings. In embodiments, the operation triggering reversion may be a result of user input or user action, such as a user pressing a "reset" button or scanning a data carrier with the scanning device. In other embodiments, the operation triggering reversion may be automatic and performed without user action, such as a lapse of time corresponding to the operator's work shift, the scanning device experiences a time period of inactivity that places the scanning device in a sleep mode, an automatic power cycle, and/or other passively performed operations.

Figure 3:
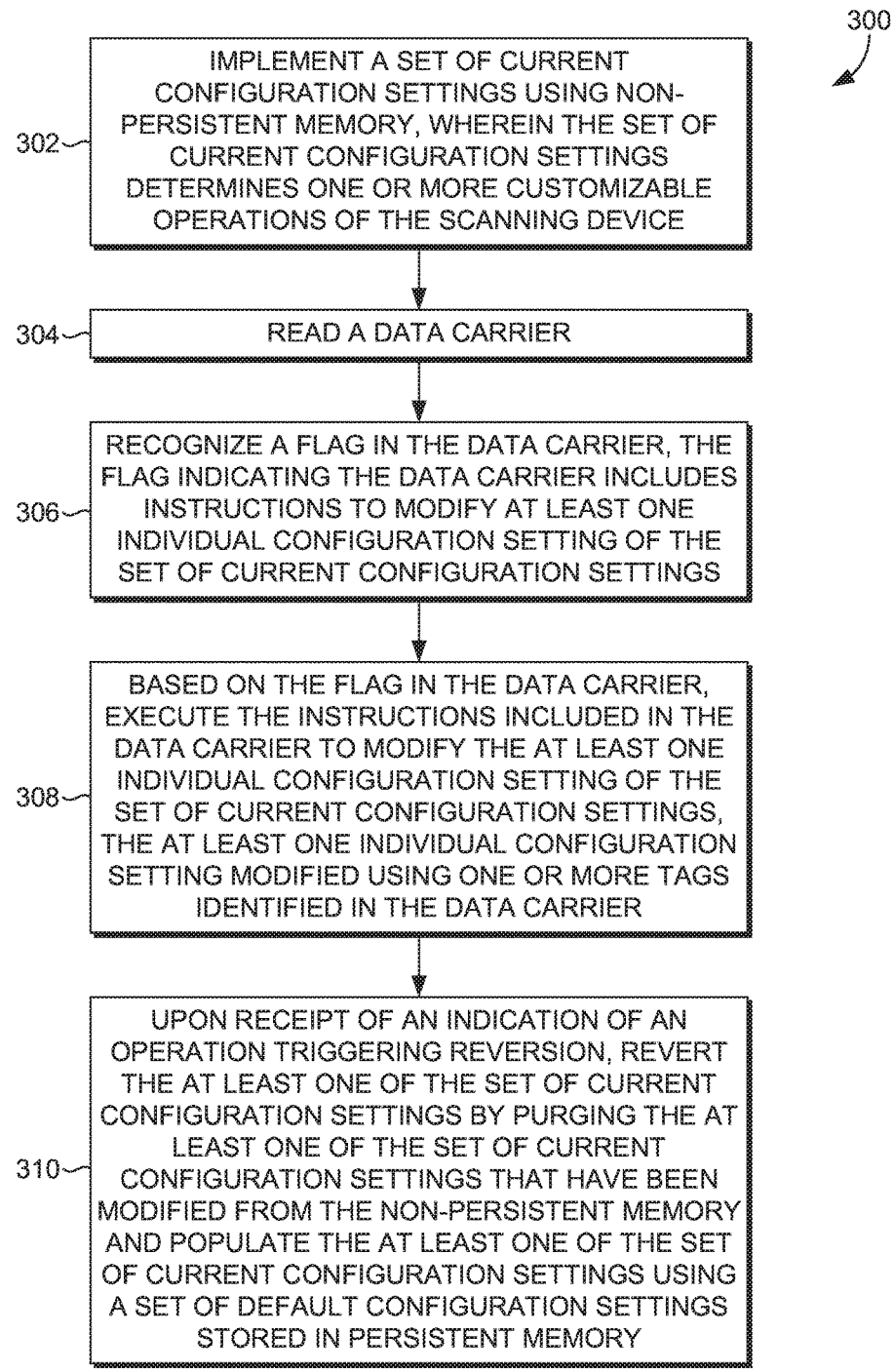
FIG. 3 is a process for non-permanent customization of scanning devices, in accordance with an embodiment of the present invention.

Turning to FIG. 3, a method 300 for non-permanent customization of scanning devices is provided, in accordance with an embodiment of the present invention. Using the method 300, operators may quickly customize one or more sensory outputs and/or performance operations of the scanning device, such as a good-read indicator light, sounds, and the like. By simply scanning the programming data carrier using the scanning device the operator intends to customize, the operator's configuration setting customizations override at least a portion of the user's default configuration settings. However, reversion back to the user's default configuration settings is easily accomplished as well, by purging modifications to the current configuration settings of the current block held in the non-persistent memory of the scanning device. Accordingly, the method 300 may be accomplished without requiring the user to hire a technical expert to manually reprogram each scanning device, without requiring that updates or new software be downloaded to each scanner, and without requiring the user to maintain significant electronic storage for holding and indexing a large library of individual operator preferences. And operator customization may be quickly and easily reverted back to default configuration settings with little or no "downtime" of a scanning device.

At block 302, the method 300 implements a set of current configuration settings using non-persistent memory. In embodiments, the set of current configuration settings determines one or more customizable operations of the scanning device. The current configuration settings may be held in the current block comprising non-persistent memory. The current configuration settings may be populated with user preferred default configuration settings stored in the factory block and/or the user block comprising persistent memory.

The method 300 continues by reading a data carrier, shown at block 304. Generally, the data carrier is scanned using a scanning component of the scanning device which an operator desires to customize. The method 300 recognizes a flag in the data carrier, as previously described with regard to one or more processors of the scanning device, at block 306. The flag indicates the data carrier is a programming data carrier that includes instructions to modify at least one individual configuration setting of the set of current configuration settings, in embodiments. Additionally or alternatively, the flag is an indication that the instructions are usable only to modify current configurations operating in the non-persistent memory. The flag may further indicate that the programming data carrier includes one or more tag value pairs, as previously described, for implementation via the programming data carrier instructions. Therefore, in some embodiments, the method 300 may recognize one or more tag value pairs, tag identifiers, and/or tag values in the data carrier. For example, in one embodiment, the method 300 identifies one or more tags in the data carrier, identifies a first individual configuration setting corresponding to the one or more tags, and identifies at least one tag value pair of the one or more tags. In one embodiment, the method 300 determines that at least one of the one or more tags provides a tag value pair usable to modify a first configuration setting of the set of current configurations.

At block 308, based on the flag, the method 300 executes the instructions included in the data carrier to non-permanently modify the at least one individual configuration setting of the set of current configuration settings. In one embodiment, the instructions included in the data carrier to non-permanently modify the at least one individual configuration setting of the set of current configuration settings are performed automatically, without operator input, in response to recognizing the flag in the data carrier. In another embodiment, at least one current configuration setting is modified using one or more tags identified in the data carrier. In embodiments where the method 300 identifies and/or determines that one or more tags in the data carrier provide a tag value pair for a first configuration setting, the method 300 implements the tag value pair for the first configuration setting of the current configuration settings using non-persistent memory. In executing the instructions included in the data carrier to non-permanently modify the at least one individual configuration setting of the set of current configuration settings, the first individual configuration setting may be modified with at least one tag value pair of said tags.

In some embodiments, implementing a tag value pair automatically modifies the first configuration setting to customize an operation of the scanning device. The first configuration setting controls sensory output to the scanning device, in some embodiments, and the sensory output may include an LED indicator color, a double-read timeout, and/or an audible indicator tone. It will be understood that the listed sensory outputs are not limiting, as other sensory outputs used to provide feedback to an operator are considered to be with the scope of the disclosure. Similarly, a plurality of aspects of individual sensory outputs may further be modified in any number of ways, including volume, pitch, a number of repetitions of the sensory output, a sequence of the same or different sensory outputs, a combination of different sensory outputs, and/or a duration of each sensory output.

Continuing, at block 310, an indication of an operation triggering reversion is received, and the method 300 reverts the modified at least one of the set of current configuration settings. The method 300 performs the reversion, in embodiments, by purging the modified at least one of the set of current configuration settings from the non-persistent memory and populating the at least one of the set of current configuration settings using a set of default configuration settings stored in persistent memory. As previously described herein, the operation triggers reversion by purging at least the portion of current configuration settings held in non-persistent memory that were modified, such that the default configuration settings stored in the persistent memory may be used to repopulate the current configuration settings.

Exemplary Distributed Embodiments

While the invention may be implemented in localized embodiments, discussed above, wherein an operator may use a programmable data carrier to automatically and non-permanently implement customizations of non-fundamental configuration settings held in the current block, the invention may be implemented in a distributed embodiment that leverages a centralized server, as will now be discussed. Further, it will be understood that the localized embodiments may be used in tandem with the distributed embodiments, such that one does not exclude or necessarily obviate the other.

Figure 4:
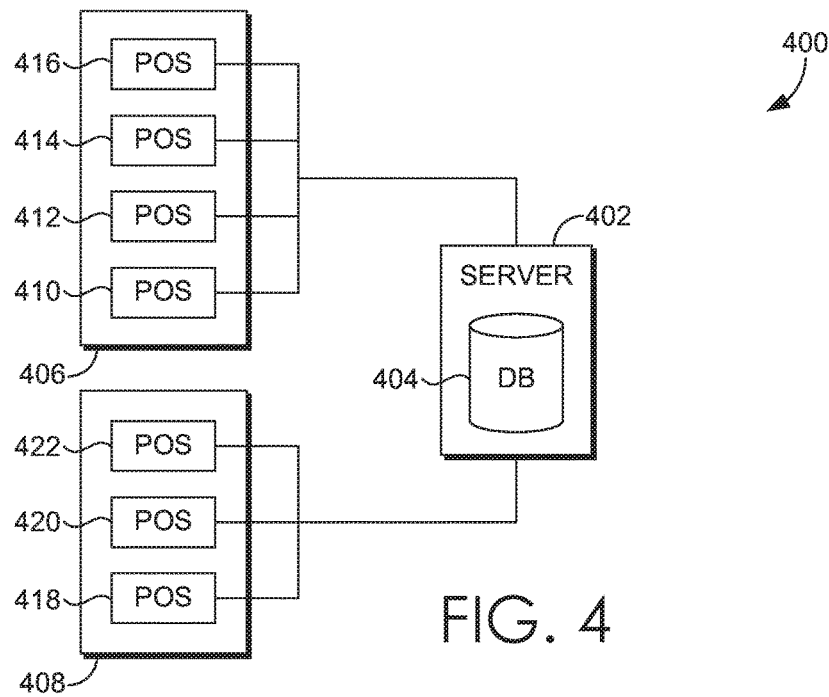
FIG. 4 is an exemplary block diagram of a distributed system, in accordance with an embodiment of the present invention.

In some embodiments, a scanning device automatically and non-permanently implements operator-specific customizations of non-fundamental configuration settings held in the current block, based on instructions and information received from a centralized server. Turning to FIG. 4, an exemplary block diagram of system 400 for non-permanent customization of a scanning device is provided, in accordance with an embodiment of the present invention. The system includes a server 402, a database 404, a first plurality of POS systems 406 and a second plurality of POS systems 408. The first plurality of POS systems 406 includes individual POS systems 410, 412, 414, and 416, and the second plurality of POS systems 408 includes individual POS systems 418, 420, and 422. The server generally includes memory and is coupled to one or more processors. In the embodiment of FIG. 4, the server and/or the memory of the server include a database. Alternatively, the server may not include the database, but merely be communicatively coupled to the database so that the server may retrieve information.

The database, comprising memory, is configured to store information including a plurality of operator-specific preferences for configuration settings of scanning devices. The database is further configured to store a plurality of work shifts (e.g., dates, times, reoccurrences, work holidays) for a plurality of operators. In some embodiments, the database is configured to receive the plurality of operator-specific preferences and the plurality of work shifts for the plurality of operators from the point-of-sale system, and to store said information.

The server is communicatively coupled to a first plurality of POS systems 406 and a second plurality of POS systems 408, each plurality generally being physically located at separate retail stores, for example. For example, the first plurality of POS systems 406 are check stands at one retail store, while the second plurality of POS systems 408 are check stands at a second retail store. In another embodiment, the first plurality of POS systems 406 are check stands at one department of a retail store, while the second plurality of POS systems 408 are check stands at a second department in the same retail store. The number of components and any implied physical locations of components in the exemplary system of FIG. 4 should not be construed as limiting, but are illustrative only. Any number of components, other components not pictured here, and various different location(s) of components are all considered to be within the scope of this disclosure. Thus, although a single server is shown in FIG. 4, it will be understood that other configurations having multiple servers are contemplated and are considered to be within the scope of the invention. For example, one retail store may use a plurality of servers to separately manage distinct populations of operators. In another example, one or more centralized servers may be used to manage a plurality of geographically distinct retail stores corresponding to the same user, or to several distinct users. In yet another example, one or more centralized servers are usable to manage POS systems located in different departments of a single retail store (e.g., at one geographic location) associated with one user, or one or more centralized servers may be used to communicate with POS systems of different users within a single retail store (e.g., a Starbucks® shop located within a Target® retail store). As such, the configurations shown in FIG. 4 are examples only and should not be construed to be limiting.

Figure 5:
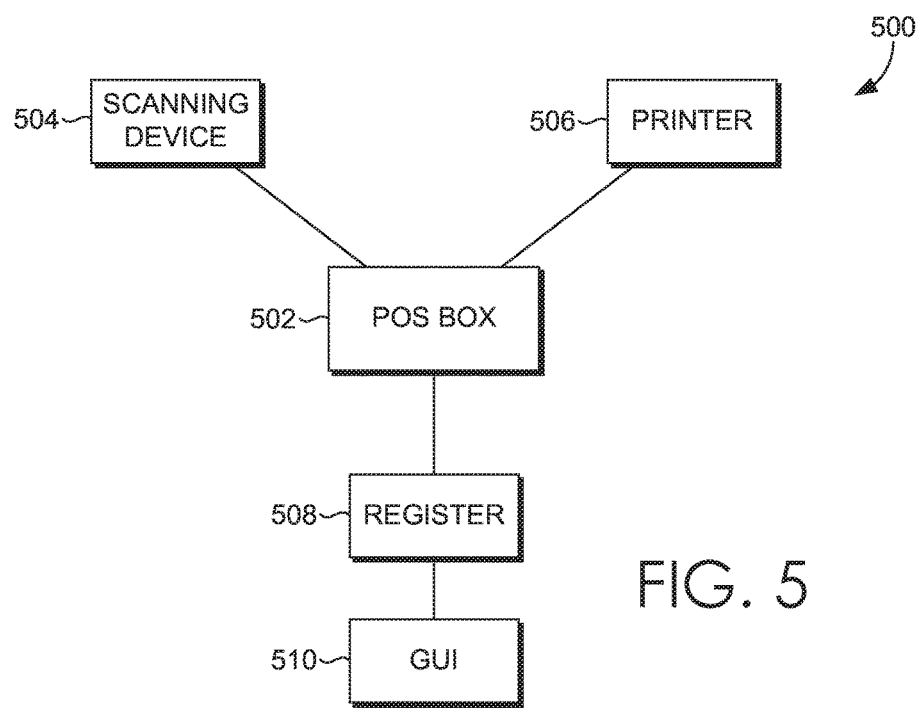
FIG. 5 is an exemplary block diagram of a point-of-sale system, in accordance with an embodiment of the present invention.

At a high level, the server communicates with a plurality of POS systems corresponding to a user and/or associated with a user retail store. As shown in FIG. 5, an exemplary POS system 500 is provided, in accordance with an embodiment of the present invention. The POS system 500 comprises a POS box 502, as will be understood by those having skill in the relevant art. The POS system 500 may be communicatively coupled to other components such as, for example, a scanning device 504, a printer 506 (e.g., for printing transaction receipts), a register 508 (e.g., a cash register, a calculator, a device for tabulating and/or tracking transactions), and a graphical user interface (GUI) 510.

Figure 6:
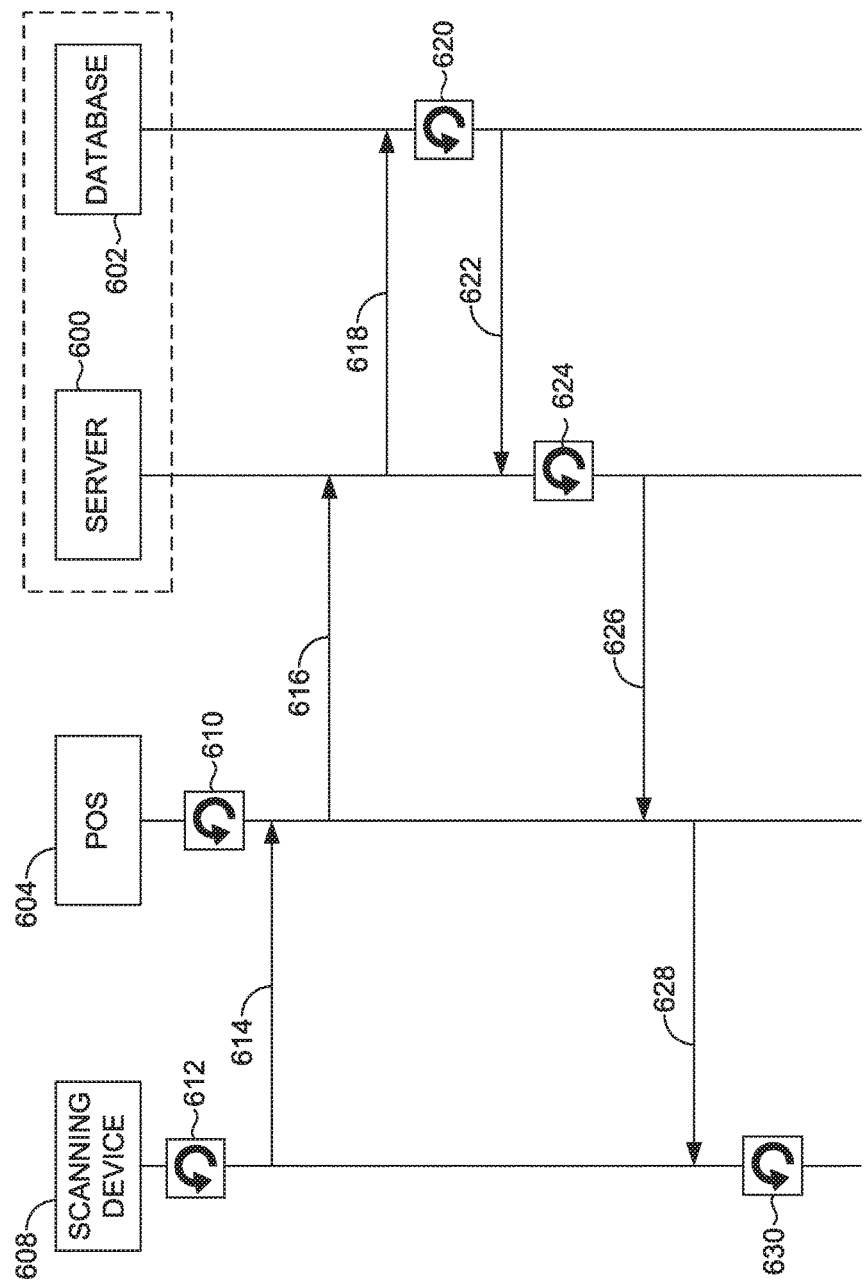
FIG. 6 is an exemplary visual representation of communications between components performing an exemplary process, in accordance with an embodiment of the present invention.

Turning to FIG. 6, an exemplary visual representation of communications between components performing an exemplary process is depicted, in accordance with an embodiment of the present invention. The system includes a server 600, a database 602, a POS system 604, and a scanning device 608. The server 600 and the database 602 are depicted as encompassed by an outlined box to indicate that the server 600 and the database 602 may be located at a location that is remote from the POS system 604 and the scanning device 608. However, in some embodiments, the server 600 and/or the database 602 may be located in the same retail environment as the POS system 604 and/or the scanning device 608.

Initially, in one embodiment, an operator may log into 610 the POS system 604, such as a computing device at a check stand, in order for the operator to begin their work shift. The operator may log into the POS system 604 using user input such as a keyboard to enter a username, password, pin code, "punch in" to a time system, and/or provide other operator identifying information. In another embodiment, an operator may use the scanning device 608 to read or scan 612 a data carrier. The data carrier may individually identify the operator and/or may include a request for operator-specific customization instructions for modifying default configuration settings of the scanning device 608, in some embodiments. An operator identifier of the data carrier may be communicated 614 to the POS system 604, as communicatively coupled to the scanning device 608. The POS system 604 generally communicates 616 operator identifying information to the server 600, as received via the operator login 610, and/or the scanning device 608.

The server 600 is configured to retrieve an operator-specific preference and a work shift from a database 602. In one embodiment, the retrieval is performed in response to or upon receipt of an indication of an operator identifier from an external POS system. As used herein, "external" refers to a POS system 604 that is physically integrated with the server 600. For example, the server 600 may be centrally located on a network while the POS system 604 is located within a retail store, remote from the server 600. The server 600 may send a request 618 to the database 602 for operator-specific preferences for configuration settings of the scanning device 608. The server 600 may send operator identifying information to the database 602, in some embodiments, to trigger 620 the location and/or return of operator-specific preferences for configuration settings of the scanning device 608. The database 602 returns 622 operator-specific preferences for configuration settings, or the location thereof, to the server 600 so that the server 600 may retrieve the operator-specific preferences. The server 600 also retrieves a work shift from the database 602 using the operator identifying information, in embodiments. The operator-specific preferences and the work shift may be retrieved individually or concurrently, in various embodiments.

In some alternative embodiments, work shift information is not present in the database 602, is not complete, and/or otherwise cannot be located therein by the server 600. The server 600 may use a predetermined default work shift as a substitute or a frequently used work shift based on other operators' information. When a work shift corresponding to the operator identifier is not found in the database 602, the server 600 may further communicate a notification to the POS system 604, in some embodiments. Such a notification may include one or more of: an error; a request for operator input via the POS system 604; and one or more operator-selectable predefined work shifts, to be provided to the operator via the POS system 604.

Having retrieved operator-specific preferences and a work shift, the server 600 is configured, in some embodiments, to generate 624 executable instructions for implementation of the operator-specific preferences at the scanning device 608 using one or more processors, for example. The executable instructions specify that the operator-specific preferences, as implemented at the scanning device 608, should persist for a duration of time corresponding to the work shift of the operator. Further, the executable instructions specify that the implementation be performed using non-persistent memory of the scanning device 608, in some embodiments.

Continuing, the server 600 communicates 626 the instructions to the POS system 604, which is remote from the server, is external to the server, and/or is separate and distinct from the server, for forwarding the instructions, the operator-specific preference, and the work shift to a scanning device 608 that is communicatively coupled to the POS system 604 receiving said instructions, for example. Then, the POS system 604 communicates 628 the instructions, the operator-specific preference, and the work shift to the scanning device 608. On receipt of the instructions, the operator-specific preference, and the work shift, the scanning device 608 implements 630 the operator-specific preferences for one or more current configuration settings in the current block, held in non-persistent memory of the scanning device 608. At the end of the operator's work shift and/or at the end of the duration of time specified in the executable instructions, the scanning device 608 purges the operator-specific preferences from the current block held in the non-persistent memory of the scanning device 608. As previously described herein above, a number of other operations and/or operator input may trigger a reversion of the current configuration settings back to default configuration settings.

In further embodiments, the server 600 may receive a notification from the POS system 604, wherein the notification provides a confirmation of receipt of the instructions for forwarding the instructions, the operator-specific preference, and the work shift to the scanning device 608. Alternatively, the server 600 may receive an error from the POS system 604, wherein the error indicates the POS system 604 did not receive the instructions, the operator-specific preference, and the work shift, for example.

Figure 7:
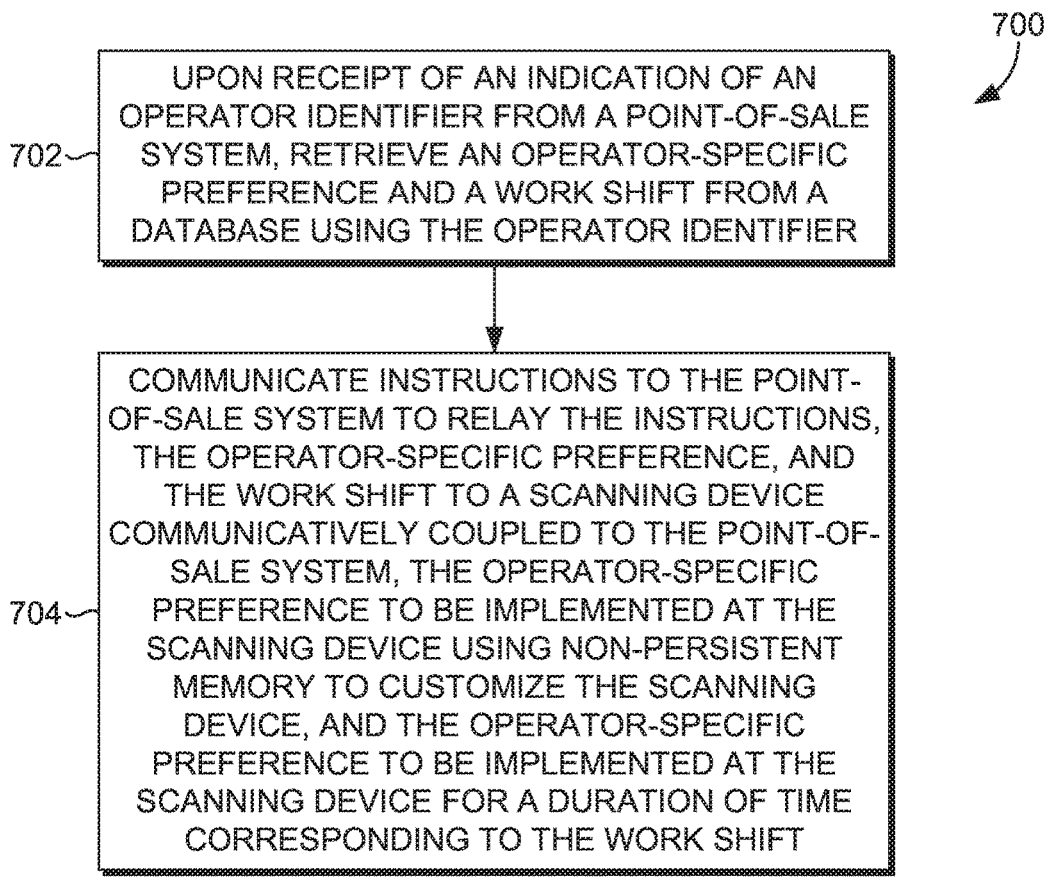
FIG. 7 is a process for non-permanent customization of scanning devices, in accordance with an embodiment of the present invention.

At FIG. 7, a method 700 providing non-permanent customization of a scanning device is depicted, in accordance with an embodiment of the present invention. The method 700 retrieves an operator-specific preference and a work shift from a database using the operator identifier, generally, in response to receipt of an indication of an operator identifier from a point-of-sale system, as shown at block 702. In one embodiment, the method 700 generates instructions based on one or more of the operator identifying information, the operator-specific preference, and the work shift. In another embodiment, the method 700 generates instructions for relaying the operator-specific preference and the work shift to a scanning device communicatively coupled to the POS system. In such an embodiment, the generated instructions specify that the operator-specific preference is to be implemented using non-persistent memory of the scanning device and is to persist for a duration of time corresponding to the work.

The method 700 communicates instructions to the POS system, as shown in block 704. In some embodiments, the POS system is instructed to relay the instructions, the operator-specific preference, and the work shift to the scanning device communicatively coupled to the POS system. The operator-specific preference may be communicated with the instructions, or as part of the instructions. In embodiments, the instructions are executable by one or more processors of the scanning device, and the instructions specify the operator-specific preference be implemented using non-persistent memory, such as the current block, as previously described herein. The operator-specific preference enables operator-specific customization of the scanning device operations, including sensory output and performance operations, for example. The instructions further indicate or specify that the scanning device may implement the operator-specific preference for a duration of time corresponding to the work shift.

In some embodiments, the method 700 includes receiving a notification from the point-of-sale system. Such a notification may provide a confirmation of successful receipt of the instructions for forwarding the operator-specific preference and the work shift to a scanning device, for example. In another embodiment, the method 700 receives a notification from the point-of-sale system, where the notification provides a confirmation that the operator-specific preference and the work shift were successfully forwarded to the scanning device.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A scanning device comprising:
 a persistent memory configured to store a set of default configuration settings;
 a non-persistent memory configured to implement a set of current configuration settings, wherein the set of current configuration settings determine one or more operations of the scanning device;
a scanning component configured to read a data carrier;
a processor configured to:
  populate the set of current configuration settings with the set of default configuration settings retrieved from the persistent memory;
  recognize a flag in the data carrier read by the scanning component, the flag indicating the data carrier includes executable instructions to modify at least one of the set of current configuration settings;
  modify the at least one of the set of current configuration settings using one or more tags identified in the executable instructions of the data carrier; and
  upon receiving an indication of an operation triggering reversion, reverting the at least one of the set of current configuration settings that have been modified back to the set of default configuration settings.

2. The scanning device of claim 1, wherein the processor is configured to populate an individual configuration setting of the set of current configuration settings with a new value specified in the one or more tags identified in the data carrier, wherein the new value is not the same as a prior value used to populate the individual configuration setting of the set of current configuration settings from the set of default configuration settings.

3. The scanning device of claim 1, wherein the processor is configured to identify one or more individual configuration settings in the set of current configuration settings to be modified based on the one or more tags.

4. The scanning device of claim 1, wherein the processor is configured to modify only a portion of the set of current configuration settings using the one or more tags identified in the instructions of the data carrier.

5. The scanning device of claim 1, wherein the processor is configured to determine the flag in the data carrier includes executable instructions to non-permanently modify a portion of the set of current configuration settings, and wherein execution of the instructions by the processor modifies one or more values for the portion of the set of current configuration settings implemented via the non-persistent memory.

6. The scanning device of claim 1, wherein the operation triggering reversion is one or more of: a power cycle; a hard reset which disconnects and reconnects the scanning device from a POS system; a soft reset which reloads software instructions for the scanning device operations; a warm reset which reloads only a portion of software instructions for scanning device operations; an operation sufficient to purge the non-persistent memory; an operation including reloading at least a portion of operating instructions of the scanning device; an operation indicating a change in operators of the scanning device; an operation indicating an end of a work shift of an operator; recognition of another data carrier including a flag indicating a reversion to the default set of configuration settings; and recognition of a subsequent reading of the data carrier including the flag indicating a modification to at least one of the set of current configuration settings.

7. The scanning device of claim 1, wherein the set of default configuration settings are predefined factory settings or predefined user settings permanently stored in the persistent memory, and wherein the set of current configuration settings are temporarily held in the non-persistent memory such that the operation triggering reversion results in a loss of the modified at least one of the set of current configuration settings.

8. A method for providing non-permanent customization of scanning devices, the method comprising:
  implementing a set of current configuration settings using non-persistent memory, wherein the set of current configuration settings determines one or more customizable operations of the scanning device;
  reading a data carrier;
  recognizing a flag in the data carrier, the flag indicating the data carrier includes instructions to modify at least one individual configuration setting of the set of current configuration settings;
  based on the flag, executing the instructions included in the data carrier to modify the at least one individual configuration setting of the set of current configuration settings, the at least one individual configuration setting modified using one or more tags identified in the data carrier; and
  upon receiving an indication of an operation triggering reversion, reverting the at least one of the set of current configuration settings that was modified by purging the modified at least one of the set of current configuration settings from the non-persistent memory and populating the at least one of the set of current configuration settings using a set of default configuration settings stored in persistent memory.

9. The method of claim 8, further comprising determining at least one of the one or more tags provides a tag value pair usable to modify a first configuration setting of the set of current configuration settings.

10. The method of claim 9, further comprising implementing the tag value pair for the first configuration setting of the set of current configuration settings using non-persistent memory.

11. The method of claim 10, wherein implementing the tag value pair automatically modifies the first configuration setting to customize an operation of the scanning device, wherein the first configuration setting controls sensory output to the scanning device, the sensory output including one or more of an LED indicator color, a double-read timeout, or an audible indicator tone.

12. The method of claim 8, wherein executing the instructions included in the data carrier to non-permanently modify the at least one individual configuration setting of the set of current configuration settings is performed automatically, without operator input, in response to recognizing the flag in the data carrier.

13. The method of claim 8, further comprising:
  identifying the one or more tags in the data carrier;
  identifying a first individual configuration setting corresponding to the one or more tags; and
  identifying at least one tag value pair of the one or more tags,
  wherein executing the instructions included in the data carrier to non-permanently modify the at least one individual configuration setting of the set of current configuration settings includes modifying the first individual configuration setting with the at least one tag value pair of the one or more tags.

14. The method of claim 8, wherein the flag further indicates the data carrier includes instructions to only modify the set of current configurations operating in the non-persistent memory.

15. A system providing non-permanent customization of scanning devices, the system comprising:
  a server including a memory and coupled to one or more processors, the server configured to:

upon receipt of an indication of an operator identifier from an external point-of-sale system, retrieve an operator-specific preference and a work shift from a database;

generate instructions for implementation of the operator-specific preference at a scanning device for a duration of time corresponding to the work shift;

communicate the instructions, the operator-specific preference, and the work shift to the external point-of-sale system, wherein the external point-of-sale system is directed to forward the instructions, the operator-specific preference, and the work shift to the scanning device, the scanning device being communicatively coupled to the external point-of-sale system; and a database including a memory, the database configured to store a plurality of operator-specific preferences and a plurality of work shifts for a plurality of operators.

16. The system of claim 15, wherein the server including a memory and coupled to one or more processors is configured to:

generate instructions specifying the implementation of the operator-specific preference at a scanning device for a duration of time corresponding to the work shift is to be performed using non-persistent memory of the scanning device.

17. The system of claim 15, wherein the database including a memory is configured to:

receive the plurality of operator-specific preferences and the plurality of work shifts for the plurality of operators from the point-of-sale system.

18. The system of claim 15, wherein the server including a memory and coupled to one or more processors is configured to:

when a work shift corresponding to the operator identifier is not found in the database, communicate a notification to the point-of-sale system, wherein the notification includes one or more of:

an error;

a request for operator input; and one or more operator-selectable predefined work shifts.

19. The system of claim 15, wherein the server including a memory and coupled to one or more processors is configured to:

receive a notification from the point-of-sale system, the notification providing a confirmation of receipt of the instructions for forwarding the instructions, the operator-specific preference, and the work shift to the scanning device.

20. A method providing non-permanent customization of a scanning device, the method comprising:

upon receiving an indication of an operator identifier from a point-of-sale system, retrieving an operator-specific preference and a work shift from a database using the operator identifier; and communicating instructions to the point-of-sale system to relay the instructions, the operator-specific preference, and the work shift to a scanning device communicatively coupled to the point-of-sale system, the operator-specific preference to be implemented at the scanning device using non-persistent memory to customize the scanning device, and the operator-specific preference to be implemented at the scanning device for a duration of time corresponding to the work shift.

21. The method of claim 20, further comprising receiving a notification from the point-of-sale system, the notification providing a confirmation of receipt of the instructions for forwarding the operator-specific preference and the work shift to a scanning device.

22. The method of claim 20, further comprising receiving a notification from the point-of-sale system, the notification providing a confirmation of forwarding the operator-specific preference and the work shift to a scanning device.

23. The method of claim 20, further comprising generating the instructions for relaying the operator-specific preference and the work shift to a scanning device communicatively coupled to the point-of-sale system, wherein the instructions specify that the operator-specific preference be implemented at the scanning device for a duration of time corresponding to the work using non-persistent memory of the scanning device.

* * * * *